Feb. 19, 1935.   R. G. GRIFFITH   1,991,978
TELEGRAPH SYSTEM
Filed April 23, 1931   8 Sheets-Sheet 1

INVENTOR
RONALD G. GRIFFITH
BY R C Hopgood
ATTORNEY

Feb. 19, 1935.   R. G. GRIFFITH   1,991,978
TELEGRAPH SYSTEM
Filed April 23, 1931   8 Sheets-Sheet 2

INVENTOR
RONALD G. GRIFFITH
BY
ATTORNEY

Feb. 19, 1935.  R. G. GRIFFITH  1,991,978
TELEGRAPH SYSTEM
Filed April 23, 1931   8 Sheets-Sheet 3
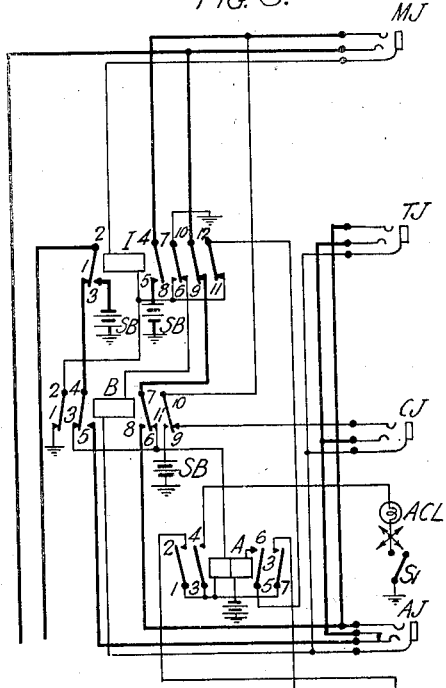
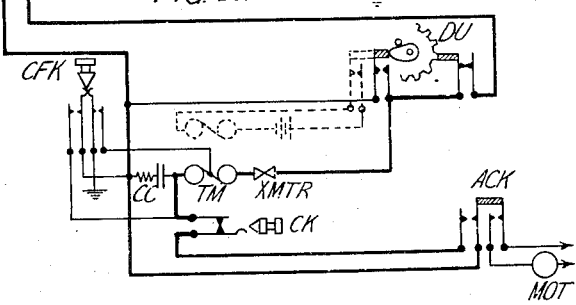
INVENTOR
RONALD G. GRIFFITH
BY
ATTORNEY Feb. 19, 1935.　　　　R. G. GRIFFITH　　　　1,991,978
TELEGRAPH SYSTEM
Filed April 23, 1931　　8 Sheets-Sheet 4
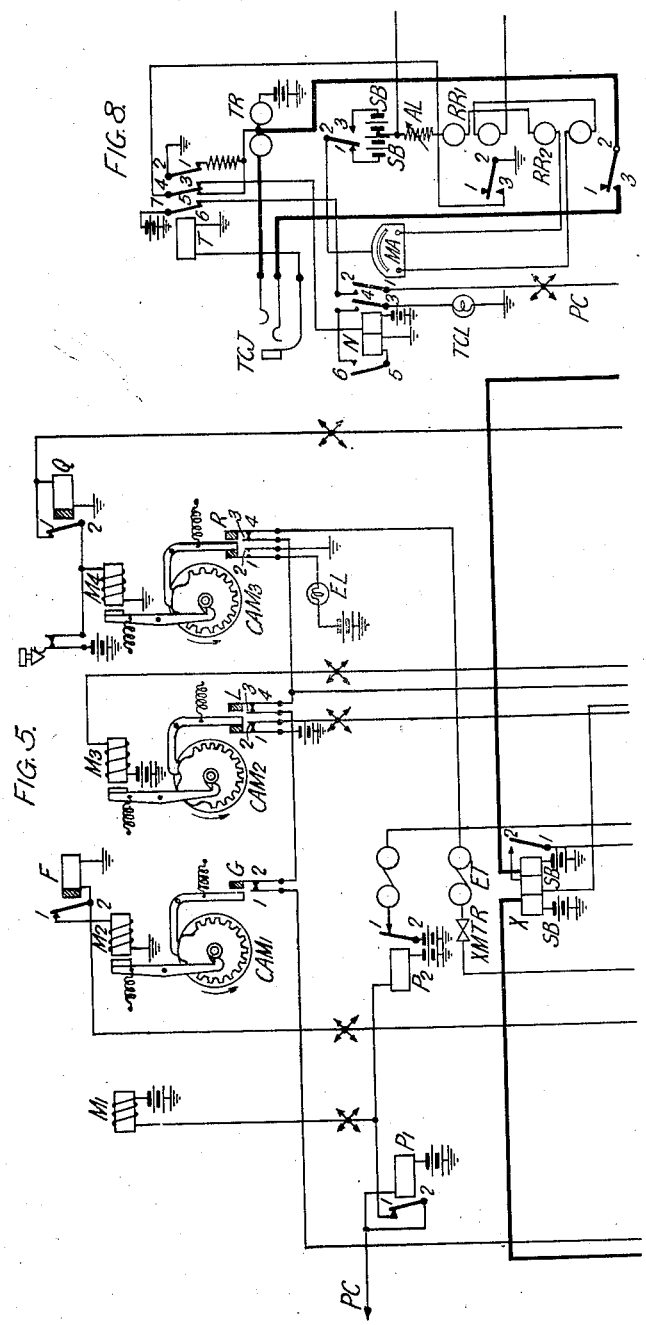
INVENTOR
RONALD G. GRIFFITH
BY
ATTORNEY Feb. 19, 1935.　　　　R. G. GRIFFITH　　　　1,991,978
TELEGRAPH SYSTEM
Filed April 23, 1931　　8 Sheets-Sheet 5

INVENTOR
RONALD G. GRIFFITH
BY
ATTORNEY

Feb. 19, 1935.          R. G. GRIFFITH           1,991,978
                        TELEGRAPH SYSTEM
                    Filed April 23, 1931    8 Sheets-Sheet 6

FIG. 9

INVENTOR
RONALD G. GRIFFITH
BY
ATTORNEY

Feb. 19, 1935.   R. G. GRIFFITH   1,991,978
TELEGRAPH SYSTEM
Filed April 23, 1931   8 Sheets-Sheet 7

INVENTOR
RONALD G. GRIFFITH
BY
ATTORNEY

Feb. 19, 1935. R. G. GRIFFITH 1,991,978
TELEGRAPH SYSTEM
Filed April 23, 1931  8 Sheets-Sheet 8

INVENTOR
RONALD G. GRIFFITH
BY
ATTORNEY

Patented Feb. 19, 1935

1,991,978

UNITED STATES PATENT OFFICE 1,991,978

TELEGRAPH SYSTEM

Ronald George Griffith, Croydon, England, assignor to Creed and Company, Limited, Croydon, England Application April 23, 1931, Serial No. 532,225
In Great Britain May 21, 1930

20 Claims. (Cl. 178—2)

This invention relates to telegraph systems wherein any two of a plurality of signalling stations can be connected together through a central interconnecting station.

The object of the invention is to provide a simple and efficient system in which telegraphic communication between stations is effected by means of break or reduced current impulses over a circuit supplied with signalling current from a source of energy at the central station.

According to one feature, the invention provides means for sending distinctive calling and clearing signals from a subscriber's station to a central station in a system of the class referred to.

According to another feature, means is provided for starting a motor for driving printing apparatus at a subscriber's station upon the connection of a cord circuit at the central station to the subscriber's line circuit.

According to yet another feature, means is associated with a cord circuit at the central station for sending signals notifying the progress of a call, to a calling subscriber consequent upon operations performed at the central station in effecting a connection to a required subscriber.

Figure 1:
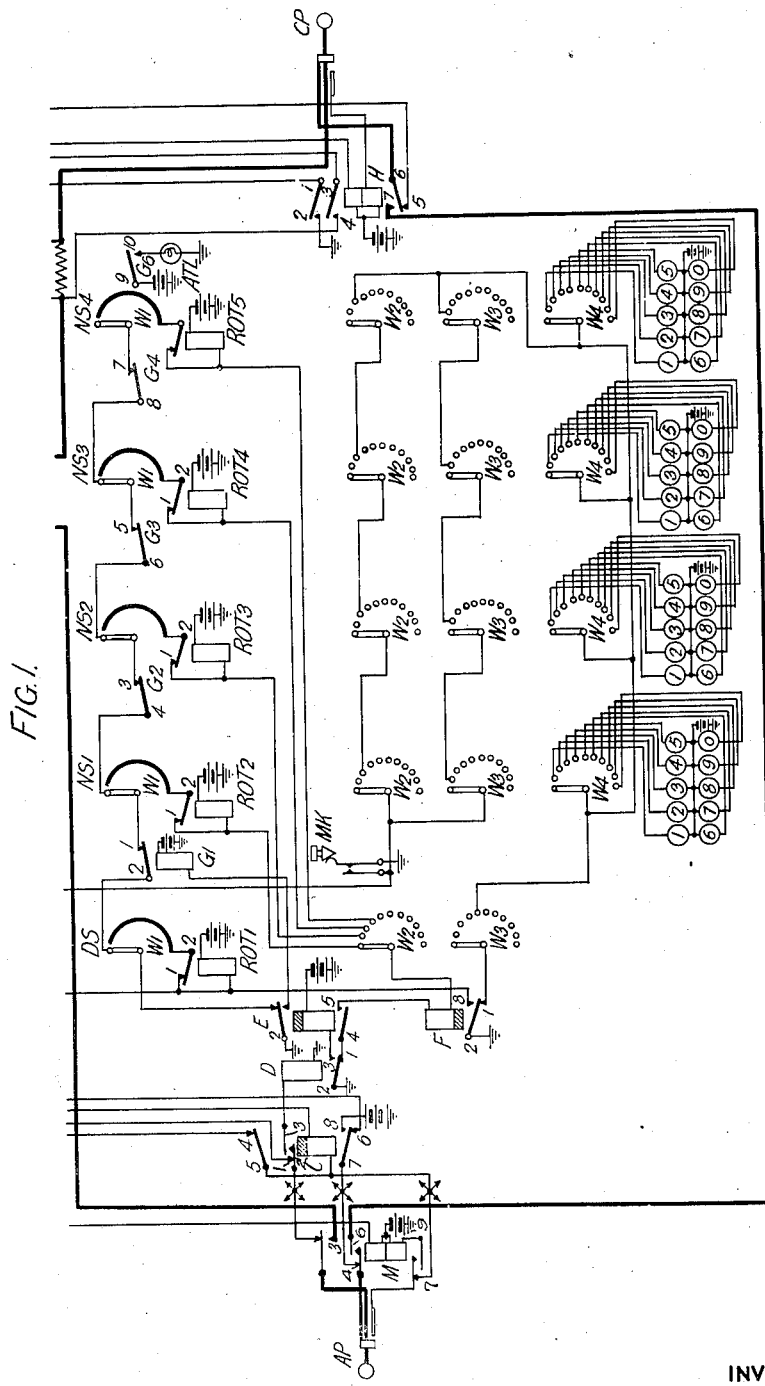
Figure 2:
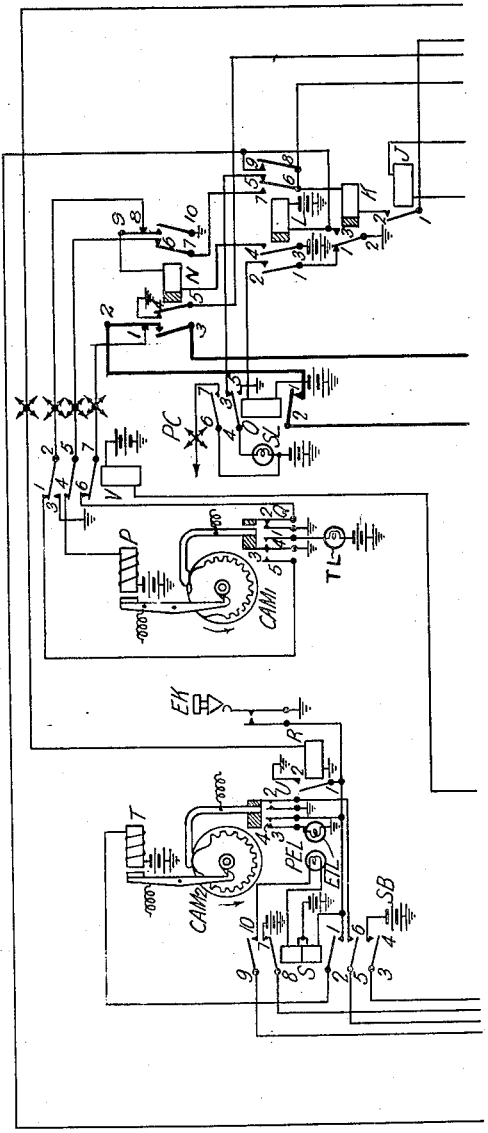

Further features will be apparent from the following descriptions in conjunction with the accompanying drawings in which Fig. 1 and Fig. 2 represent a cord at the central station, Fig. 3 the terminal arrangements of a subscriber's line at the central station and Fig. 4 the connections at the subscriber's station in a system in which operations to effect the connection of a calling subscriber to a required subscriber are manually performed at the central station in accordance with the indication of a required subscriber set up on a display panel under the control of current impulses from the calling subscriber.

Figure 6:
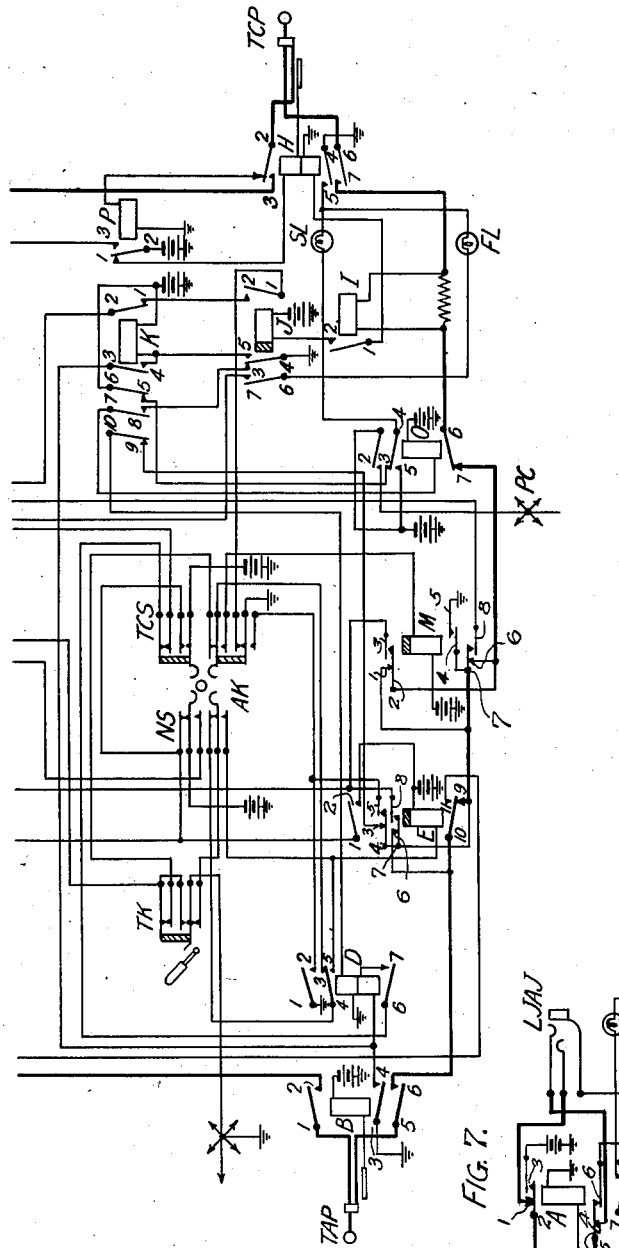

An alternative arrangement of a cord circuit is then shown with reference to Figs. 5 and 6 in which the indication of a required station or subscriber is transmitted to the central station by the operation of printing telegraph apparatus normally provided at the subscriber's station for effecting telegraphic communication. The subscriber's line and terminal connections shown in Figures 3 and 4 will also serve for the cord circuit of Figs. 5 and 6 but in this case the subscriber's impulsing dial will not be used. The circuit arrangements of Figs. 5 and 6 is described as for a "trunk" position at the central station. In this case the tie-line shown in Fig. 7 may conveniently be used for extending a calling subscriber thereto. Fig. 8 shows arrangements which may be employed for signalling over trunk lines between two central interconnecting stations.

Figure 10:
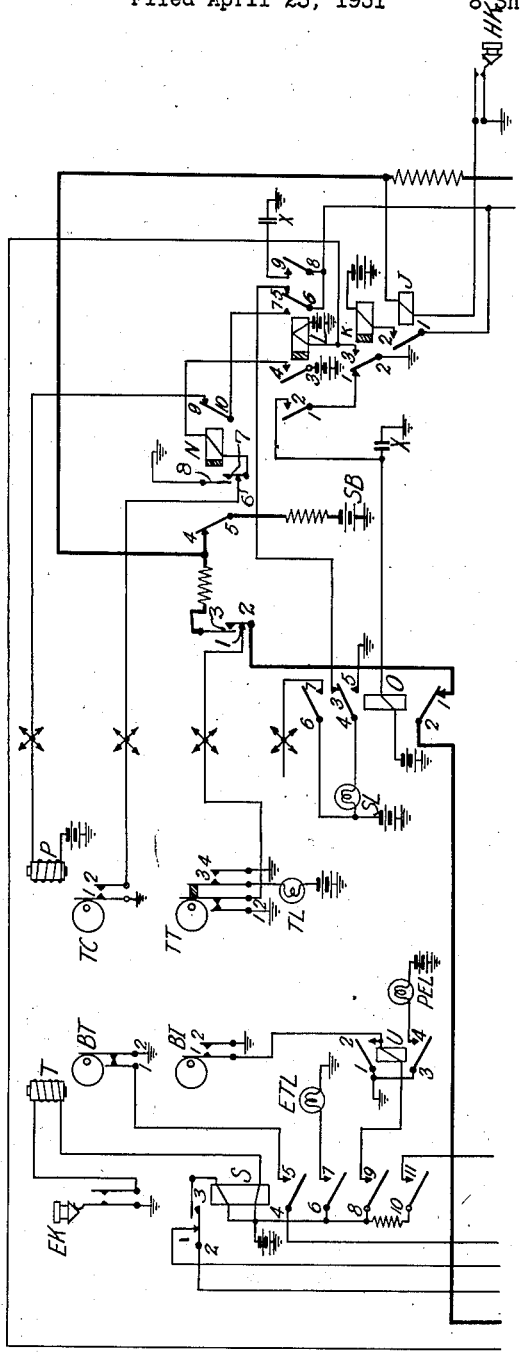
Figure 11:
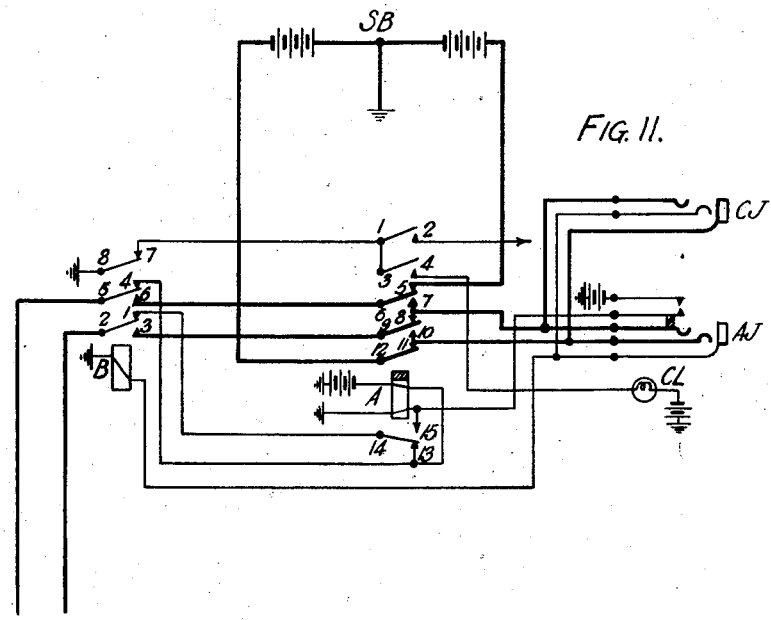
Figure 12:
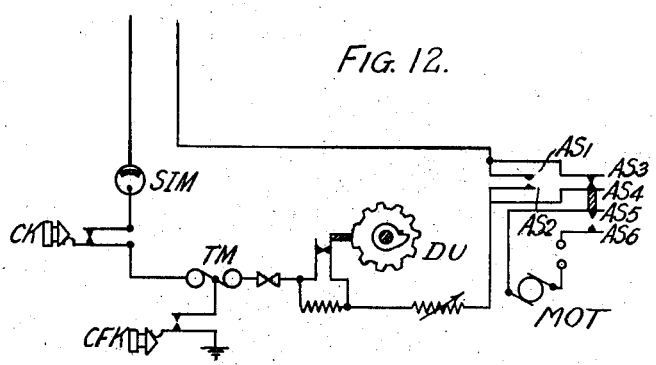

A cord circuit operating on similar general principles to that of Fig. 2 is then shown with reference to Figs. 9 and 10 with the subscriber's terminal arrangements at the central station shown in Fig. 11 and the terminal arrangements at the subscriber's station in Fig. 12. The simplification effected in these arrangements over those of the corresponding Figs. 1, 2, 3 and 4 render the arrangement suitable for a system with a limited number of subscriber's lines, but it will be clear to those skilled in the art that considerable modifications can be effected to any of the circuit arrangements shown and described in the present specification without departing from the spirit of the invention as more particularly defined in the claims hereinafter appended.

For the correct operation of many circuits described in the present specification, it is necessary that certain relay tongues make contact with their front contact stops on operation of the armature, before breaking contact with their back contact stops. Such relays are well known in the art. Those pairs of relay contacts shown in the present drawings which should be so arranged are indicated in the conventional manner.

METHOD OF OPERATION OF THE CIRCUIT ARRANGEMENTS SHOWN IN FIGURES 1, 2, 3 AND 4

(1) *The subscriber originating a call*

To call the exchange the subscriber earths the loop by operating the "calling" key CFK (Fig. 4). This energizes his "calling" relay A at the exchange and causes his "calling" lamp CL to glow. When the "calling" relay A operates it locks itself in the operated condition by establishing the following circuit:—

Earth, contacts B1, B2, contacts I11, I12, contacts A5, A6, windings of relay A to battery.

(2) *The exchange answering a call*

To answer a call the exchange operator inserts an "answering" plug AP of a connecting cord into the line jack AJ of the glowing "calling" lamp. This operation energizes the cut-off relay B, and the display pick-up relay C in series, through the following circuit:—

From earth, through contacts I7, I6, windings of relay B, via the sleeve connection of the "answering" plug and jack, AP, AJ, through contacts M8, M7, windings of relay C, contacts S8 S7 to battery.

Relay B operating interrupts the locking circuit of relay A at contacts B1, B2; therefore, with the operation of relay B relay A becomes de-energized and "calling" lamp CL is extinguished. The operating of relay B and C connects the impulsing relay D of the display equipment to the "calling" subscriber by establishing the following circuit:—

From battery, through contacts C8 C7, contacts M4, M5, via the "ring" connection of the connecting plug and jack AP, AJ, through contacts B8, B7, contacts I9, I10, via the line through the subscriber's equipment, back through contacts I2, I1, contacts B4 B5, the "tip" connection of the plug and jack AP, AJ, through contacts M1 M2, contacts C2 C3, the windings of the impulsing relay D to earth.

When current traverses this circuit the "calling" subscriber's motor is started, thus giving him indication to dial the "wanted" number.

(3) *The subscriber giving the number required*

Having operated his "calling" key the "calling" subscriber then waits until his teleprinter motor starts, the starting of which informs the "calling" subscriber that he is connected to the display equipment at the exchange by means of the dialling unit DU. He then dials the number of the "wanted" subscriber.

The energization of relay D, as above described in turn effects the energization of the resetting relay E through contacts D2 D3. The resetting relay E when energized prevents the resetting of the five selector switches of the display equipment by operating the "off normal" relay GI, through E2 E3, as hereinafter described.

In order to display the "wanted" number at the exchange the subscriber has to transmit a certain number of groups of impulses that are known to the art of automatic telephony as "dialling" impulses. Therefore, in other words, a "calling" subscriber has to dial a certain number of times in order to display the "wanted" number at the exchange.

These groups of impulses cause relay D to operate a certain number of times. During the first group of impulses each operation of relay D operates the first number selector magnet (RoT2). a certain number of times determined by the number of impulses recorded on relay D. This is achieved through the following circuit:—

From contacts D1 D2, contacts E4 E5, windings of digit selector relay F, first contact position of "wipers" W2 of the digit selector DS, windings of the first number selector magnet (RoT2) to battery.

The transmission of the first group of impulses through the first number selector magnet (RoT2) causes the "wipers" of the first number selector NS1, to be stepped round to a position determined by the number of times RoT2 is energized. The transmission of this first group of impulses through the digit selector relay F causes it to operate and through contacts F2 F3, complete a circuit to the driving magnet RoT1, of the digit selector DS.

Consequently the number of steps made by the wiper NS1 are the same as the number of impulses signalled in the group.

At the end of the transmission of the first group of impulses representing the first digit, the subscriber then operates his dial to transmit the second digit. During this time i. e. until the release of the impulsing relay D the relay E remains energized. When relay F becomes de-energized RoT1 is also de-energized. This causes the contact arms or so called "wipers" of the digit selector to be stepped one division, or in other words, on to their next contact.

When the "calling" subscriber releases the dial to transmit the second digit group of impulses, the relay F is again energized in series with the driving magnet of the second number selector (RoT3) via the second position of "wiper" W2 of digit selector DS.

The driving magnet (RoT3) is energized for a number of times equivalent to the number of impulses transmitted in the second group and so steps its "wipers" the same number of divisions. Consequently, when the "calling" subscriber is operating the dial to transmit the third group of impulses, relays D and E again remain energized. Relay F is again de-energized and causes the "wipers" of the digit selector to be stepped on to the next contact. The release of the third group of impulses energizes RoT3 via the third position of "wiper" W2 of digit selector DS, and causes its "wipers" to be stepped the number of times equivalent to the number of impulses transmitted in the third group.

When the "calling" subscriber is resetting the dial to transmit the fourth digit, the "wipers" of the digit selector are again stepped on to the next contact. Therefore, the fourth group of impulses operate the driving magnet (RoT4) of the fourth number selector via the fourth position of "wiper" W2 of digit selector DS, causing its "wipers" to be stepped a number of times determined by the number of impulses received in the fourth group.

On the completion of the transmission of the fourth group of impulses, relays D and E remain energized and relay F is de-energized, which causes the "wipers" of the digit selector to be stepped on to the fifth position. This causes all the selected lamps to light through contacts F1, F2, through the "wiper" W3 of the digit selector to the "wipers" W4 of the four number selectors, via the selected contacts and their respective lamps to the battery. Thus the number dialled by the "calling" subscriber is displayed to the exchange operator.

(4) *Exchange establishing a connection with the "called" subscriber*

Having observed the number displayed by the "calling" subscriber the exchange operator inserts a "calling" plug CP into the required subscriber's "calling" jack MJ, (located in the multiple field). The insertion of a "calling" plug into the "calling" jack lights the supervisory lamp SL through contacts H2 H1, contacts L6 L5 and contacts O3 O4, after the "protective calling plug sleeve" relay H and the "calling jack cut-off" relay I have operated in series. The operation of relay I connects the battery SB at contacts I2 I3 through the "called" subscriber's teleprinter, back via the "tip" connection of the "calling" plug and jack CP, MJ, through the windings of the supervisory relay J, contacts H3 H4 and contacts N5 N4 to earth.

(5) *Starting of the "called" subscriber's teleprinter motor*

When this circuit is completed the "called" subscriber's teleprinter relay TM is operated. This releases mechanical functions that cause the teleprinter motor to start.

When current flows through the previously outlined circuit the "supervisory" relay J is operated. The operating of relay J causes relay K to operate via contacts J1 J2 and contacts H1 H2. The operation of relay K operates relay L and relay M through contacts K2 K3.

(6) Loop test

The operation of relay L breaks contacts L5 L6 which extinguishes the "supervisory" lamp SL that was lighted when the "calling" plug was inserted in the "calling" jack.

(7) Automatic release of the exchange display equipment from the cord circuit The operation of relay M causes the display pick-up relay C and impulsing relay D to become de-energized and so releases them from the cord circuit.

After impulsing relay D has remained de-energized for a certain period the resetting relay E also becomes de-energized. With the release of the armatures of relay E the "off normal" relay G1 is also de-energized. A circuit is completed from battery, RoT1 and its own contacts 1, 2 resetting wiper of the digit selector contacts E1, E2 to earth. Magnet RoT1 and its contacts 1, 2, cause the circuit to be self interrupting and the "wipers" of the digit selector to be rotated thereby to their normal position. When the wipers of the digit selector leave their fifth contacts the lighted lamps in the display device are extinguished. When the "wipers" of the digit selector reach the normal position earth potential is applied in the same manner to the "resetting wipers" W1 of the first number selector. This causes RoT2 to rotate the "wipers" to the normal position. A similar sequence of operation is continued until the "wipers" of the fourth number selector arrive at their normal position.

(8) Exchange indication that connection is completed

When the connection has been established the letters "Thro" are automatically transmitted in the following manner:—

With the operation of relay L, the release magnet P of the "Thro" automatic signalling unit is energized through contacts H2 H1, contacts L6, L7, contacts N7 N6 and contacts V5 V4. The operation of this magnet causes the contacts Q1 Q2 to reproduce teleprinter impulses that will cause the letters "Thro" to be typed on the "calling" subscriber's teleprinter, through the following circuit:—

From the signalling battery, through operated contacts I5 I4, through the "ring" connection of the "calling" plug and jack, via contacts H6, H7, via contacts M6 M5, through the "ring" connection of the "answering" plug and jack, via contacts B8 B7, contacts I9 I10, through the line to the "calling" subscriber's teleprinter, back via the line through contacts I2, I1, through contacts B4 B5, through the "tip" connection of the "answering" plug and jack, through contacts M2 M3, contacts O2 O1, through contacts N2 N1, contacts V7 V6, through transmitting contacts Q1 Q2 to earth.

(9) Exchange operator given indication that connection has been established

During the transmission of the letters "Thro" contacts Q3 Q4 are closed. This causes the "Thro" connecting lamp TL to glow. On the completion of the transmission of the letters "Thro" contacts Q3 Q5 are closed for a predetermined interval. This causes relay N to operate through the following circuit:—

Contacts L3 L4, through the windings of relay N, contacts N9 N8, contacts V2 V1, the circuit being completed when contacts Q5 Q3 are closed.

(10) Completion of connection and the release of the exchange signalling unit When relay N operates, it energizes itself through contacts L4 L3 and N9 N10. The operation of relay N also releases the automatic "Thro" signalling unit from the particular cord circuit, removing the earth "Bar" and connecting the "called" and "calling" subscriber together.

With the operation of relay N, the "calling" and "called" subscribers are connected in the following manner:—

From signalling battery, through contacts I5 I4, of the called subscriber's equipment at the central station through the "ring" connection of the "calling" plug and jack, via contacts H6 H7, contacts M6 M5, through the "ring" connection of the "answering" plug and jack, through contacts B8 B7, via contacts I9 I10, through the line and the "calling" subscriber's teleprinter, back through the line via contacts I2 I1, of the calling subscriber's equipment contacts B4 B5, through the "tip" connection of the "answering" plug and jack, via contacts M2 M3, contacts O2 O1, contacts N2 N3, through the "supervisory" relay J, through the "tip" connection of the "calling" plug and jack, through the line to the "called" subscriber's teleprinter, back via contacts I2 I3 of the called subscribers equipment and the signalling battery.

(11) Transmission of teleprinter conversation

When the previously outlined circuit is established the teleprinter conversation can be effected between the "calling" and "called" subscriber.

Before transmitting messages however, it may be desirable for the calling subscriber to receive an indication that he is connected to the correct subscriber to whom he wishes to transmit. This is especially desirable in the present system wherein telegraphic communication can be effected without the intervention of any manual operation on the part of the "called" subscriber. For this purpose, the means described in United States application No. 519,038 may conveniently be incorporated with the subscriber's apparatus whereby the calling subscriber, on depression of a key allotted for that purpose in the transmitter keyboard or on transmission of a particular signal, can effect the release of means at the called subscriber's station to which he is now connected which will transmit back to the calling subscriber an indication individual to that called subscriber. This indication may conveniently consist of signals representing the exchange name and number of the subscriber's apparatus. Similar means may also be provided in conjunction with the exchange equipment whereby a calling subscriber can obtain a positive indication that he is connected to the exchange apparatus before transmitting the indication of the required subscriber.

The actual means for effecting these facilities are not here described but may readily be appreciated from the description thereof given in the specification of the above mentioned United States application No. 519,038. It will be appreciated however that no modification of the present arrangements are necessary when incorpo-

(12) *The subscriber clearing an exchange connection*

Having completed transmission the subscriber depresses the clearing key CK, which immediately clears the connection at the exchange, lighting the "supervisory" lamp SL, in the following manner:—

If either the "calling" or "called" subscriber depress their clearing key CK for a predetermined period, the "supervisory" relay J becomes de-energized, which in turn de-energizes relay K. Relay O is then energized through contacts K2 K1, and contacts L1 L2. When relay O is energized the line circuit is interrupted at contacts O2 O1. The "supervisory" lamp SL glows through contacts O5 O4.

(13) *Automatic clearing of a call by subscriber's teleprinter*

To prevent the subscriber holding the line indefinitely after he has concluded his transmission a device is incorporated in the teleprinter which will clear the call automatically after an idle line period of approximately two minutes. This device may conveniently be of the type shown in United States Patent No. 1,834,349 whereby after the above mentioned idle line period contacts ACK are opened. The opening of these contacts causes the same functions at the exchange as the operating of the subscriber's "clearing" key CK, and in addition the circuit of the subscriber's teleprinter motor MOT is opened to stop the motor.

(14) *Exchange operator breaking down connection*

Having observed the glowing "supervisory" lamp SL the exchange operator breaks down connection by removing both the "answering" and "calling" plugs. This action de-energizes cut-off relay B, "calling" jack cut-off relay I and relay H. When relay H becomes de-energized relays L, N, O and M also become de-energized, and thus the cord circuit is again in the idle connection.

(15) *Engage test*

When the exchange operator inserts a "calling" plug into the calling jack of the engaged line, the letters "Busy" are automatically transmitted. This transmission is indicated to the exchange operator by the glowing of a "Busy" lamp. The insertion of a "calling" plug in an engaged line cannot interfere with an existing conversation. The automatic transmission of the letters "Busy" is achieved in the following manner:—

Whenever an "answering" plug is inserted in an "answering" jack, or a "calling" plug is inserted in a "calling" jack, the signalling battery potential is always placed on the "ring" connection of the "calling" jack or jacks, if multipled. Therefore, the insertion of a "calling" plug into a "calling" jack of an engaged line establishes the following circuit:—

From the "ring" connection of the "calling" jack and plug, via contacts H6 H5, through relay R causing relay R to operate. The operation of relay R operates relay S, and the release magnet T of the "busy" automatic signalling unit, through contacts S1 S2. Relay S operates, breaking the operating circuit of relay T at S1, S2 and of relay C at S8 S7. Relay C becomes de-energized, connecting the "calling" subscriber to the "busy" transmitting contacts U1 U2, via contacts C2 C1 and contacts S5 S6. The SB battery is also removed from contact C8 and is applied via contacts C7 C6 and contacts S3 S4.

The positive indication of an engaged test is given by the lighting of the positive engage lamp PEL. When this condition is established teleprinter impulses are transmitted from contacts U1 U2 to the "calling" subscriber that cause the letters "Busy" to be typed on his teleprinter.

During the transmission of the letters "Busy" contacts U3 U4 are closed, due to the operating lever descending from the raised rest position of of the cam. This causes the engaged transmitting lamp ETL to light. The introduction of these two "engaged" lamps being made for the following reasons:—

(a) The ETL lamp gives positive indication that transmission of the letters "Busy" is in progress.

(b) The PEL lamp serves to give positive indication of connection to an engaged line before and after the transmission of the letters "Busy".

(16) *The "engaged" key*

To enable the exchange operator to cause the letters "Busy" to be typed on the "calling" subscriber's teleprinter, when it is impossible to connect to the wanted subscriber, an "engaged" key EK has been added.

It is also proposed to use a jack for the same purpose, if required. The depression of the "engaged" key causes the same functions as the operation of relay R.

(17) *The "calling" subscriber wanting connection with supervisor or monitoring operator*

If the "calling" subscriber requires connection to either the trunk supervisor or the monitor, he will dial a predetermined number such as "1111". Upon the receipt of this number the exchange operator would extend the call to the desired position. The setting up of this number operates relay V. The operation of this prevents the transmission of the letters "Thro" that would otherwise be transmitted when the call is extended by the operation of the "supervisory" relay J.

(18) *"Calling" subscriber wanting trunk connection*

When a "calling" subscriber wishes to make a trunk call he will dial a predetermined number such as "2222" and upon reception of this indication the exchange operator would extend the call through to the "trunk" position. Relay V is also operated with the reception of this number, the operation of which prevents the transmission of the letters "Thro" to the "calling" subscriber when the call is extended to the "trunk" position.

(19) *Subscriber experiencing trouble when dialing*

If the local exchange operator observes the "calling" subscriber is experiencing difficulty she immediately extends the call to the monitor's position. The key MK furnishes the facility to prevent the transmission of the letters "Thro" to the "calling" subscriber when the call is extended to the monitor's position. When extending a call to the monitor's position the operator depresses the MK key until the "off" normal lamp ATL becomes extinguished.

Alternative arrangements

Figure 7:
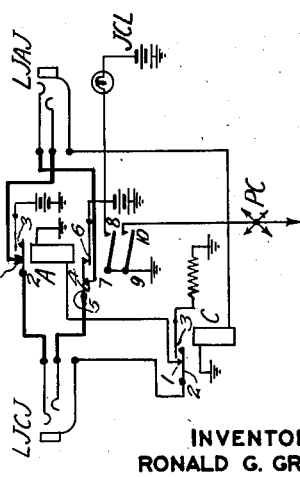

The following description relates to the extension of a "trunk" call, that is, to the extension of a call from a subscriber's station through the central station cord circuit of Figs. 1 and 2, the tie line of Fig. 7, and the line jack of Fig. 8 to a called subscriber's station associated with another central station.

(1) *The "local" operator extending a "trunk" call*

The "local" operator position observing the displayed indication that a "trunk" call is desired extends the "calling" subscriber to the "trunk" position by inserting the "calling plug" CP (Fig. 1) into an idle jack LJCJ of a "tie" line Fig. 7. This operation energizes relay A through contacts C1 C2, through the sleeve connection of LJCJ and the "calling" plug CP, through the windings of relay H (Fig. 1) and lights the "calling" lamp JCL of the respective "tie" line answering jack LJAJ at the "trunk" position.

(2) *The automatic starting of the exchange teleprinter motor by a "calling" subscriber*

It is arranged that when the pilot circuit PC is operated by the glowing of any "service" lamp, the operation of the pilot circuit energizes relay P1. As this relay is slow acting the operation of the pilot circuit also causes the automatic signalling unit start magnet M1 and teleprinter start relay P2 to be energized for a predetermined impulse period, via contacts 1 and 2 of relay P1.

When all "answering" keys are in the idle position, a circuit is established through their contacts in series, via the auxiliary windings of the teleprinter magnet ET through contacts 1 and 2 of relay P2 to battery. This circuit holds the exchange teleprinter in the "stop" condition.

As previously explained with the operation of the pilot circuit PC relay P2 is energized for an impulse period, which operation breaks the holding current through the auxiliary windings of the teleprinter magnet, thus a starting impulse is produced by the teleprinter magnet which causes the release of mechanical functions that in turn cause the teleprinter motor to start.

(3) *The "trunk" operator answering an outgoing call*

To answer an outgoing call the "trunk" operator inserts an "answering" plug TAP into the "tie" line jack LJAJ of the glowing "calling" lamp. This operation causes the relays B and C to operate through the following circuit:—

Battery, the windings of relay B, the sleeve connection of plug TAP and LJAJ, the windings of relay C to earth.

The operation of relay C de-energizes relay A. This extinguishes the "calling" lamp JCL and also extends the "calling" subscriber via the "tip" connection, contacts B1, B2, through one winding of relay X to battery and via the "ring" connection, through contacts B5 B6 contacts E6 E7, and contacts E9 E10 in parallel, contacts E4, E3, contacts K9 K10 through the windings of relay D to earth.

(4) *Automatic connection of the exchange start-stop apparatus*

When current flows through this circuit relay D is operated, and it locks itself energized through contacts B3 B4, contacts D7 D6, through the contacts of the "trunk" calling key, the contacts L1 L2, to the battery.

The further function achieved with the operation of relay D is the operation of relay E which is energized through contacts D5 D4, via contacts of the "answering" key AK and "trouble" key TK to earth.

With the operation of the relay E the operating circuit of relay D is broken at contacts E3 E4, but earth is maintained on the "calling" subscriber's line through contacts E4, E5, and contacts D1 D2.

(5) *The automatic transmission of start-stop impulses when exchange apparatus enters the circuit*

The closing of contacts E1 E2 controls the transmission of the start-stop impulses that cause indication to be typed on the "calling" subscriber's teleprinter that the exchange receiving apparatus is in circuit.

The closing of contacts E1, E2 energizes relay F and magnet M2 through contacts F2, F1. The energizing of magnet M2 causes the required teleprinter impulses to be reproduced on contacts G1 G2. With the operation of relay E the "calling" subscriber's circuit is extended through contacts E10, E11, via contacts G1 G2, contacts L3 L4, contacts R3 R4, through the teleprinter relay magnet ET, through the teleprinter transmitter XMTR, through contacts E8 E7, contacts E4 E5, contacts D2 D1, to earth. Therefore, the teleprinter impulses reproduced by contacts G1 G2 are recorded on both the "calling" subscriber and exchange teleprinters.

(6) *Subscriber giving number required*

Having received the typed indication that the exchange teleprinter is in circuit the subscriber then transmits teleprinter impulses that cause the number of the subscriber with whom he wants connection to be typed up on the exchange teleprinter.

(7) *The "trunk" operator calling the required exchange*

Having observed the number and exchange of the "wanted" subscriber the exchange operator throws the "answering" key AK to the "trunk" calling side TCS. This breaks the locking circuit of relay D, thus causing it to become de-energized. The de-energizing of relay D de-energizes relay E and also causes relay M to operate through the following circuit:—

Battery, the windings of relay M, contacts of "answering" key AK (trunk calling side TCS) D3, D4, through contacts of "answering" key normal side NS and "trouble" key TK to earth through all answering keys in series.

The operation of relay M and the de-energizing of relay E removes the earth connection of the "calling" subscriber from contacts E4 to contacts M4 M5. The circuit of the "calling" subscriber following the operation of relay M is as follows:—

From the signalling battery SB through one winding of relay X, via contacts B2, B1, through the "tip" connection to the "calling" subscriber, back via the "ring" connection through contacts B5 B6, to contacts E10 E9 and E7 E6 in parallel, contacts M4 M5 to earth.

The operator having observed the exchange to which connection is required inserts the "calling" plug TCP in the line jack TCJ (Fig. 8) of a "trunk" line connected to the required exchange.

Inserting the "calling" plug TCP into the "trunk" line jack TCJ, relays H and T are energized in series. The operation of relay T breaks the spacing current from the transmitting relay TR by interrupting contacts T1 and T2. The transmitting relay TR has a permanent bias to mark. Consequently, when the spacing current is removed, due to the permanent bias to mark, this relay operates to mark. A marking current is then transmitted from contacts TR3, TR2, to the centre point of the differential milliammeter MA, passed differentially through the receiving relays RR1, RR2, over the "trunk" line through the receiving relays at the distant exchange and back to the centre point of the transmitting battery. The marking of the receiving relays at the distant end causes the "calling" lamp corresponding to TCL at that end to glow.

(8) *Exchange answering "incoming" trunk calls*

As previously explained, to call the distant exchange the marking current is signalled over the line. The arrival of this marking current marks the unbiassed (neutrally set) receiving relays RR1 RR2, the operation of which causes "calling" lamp TCL to glow, by energizing "calling" relay N through the following circuit:—

Contacts RR12, RR13, contacts T4 T3, "calling" relay N.

The exchange operator observing a glowing "calling" lamp inserts an "answering" plug TAP into the respective line jack. This function causes relays B and T to operate in series.

As previously described relay D operates, causing relay E to operate. The operation of relay E releasing the transmission of indication that the exchange teleprinter is in circuit. After receiving the "wanted" subscriber's number he inserts the "calling" plug TCP into the required subscriber's "calling" jack MJ (Fig. 3).

(9) *Giving the "distant" exchange the number of "wanted" subscriber*

The arrival of the marking current from the "distant" exchange marks the receiving relays RR1 and RR2. This establishes the exchange teleprinter circuit and the received teleprinter impulses that are thus recorded by the operation of the following circuit:—

Contacts RR23, RR22, through one winding of the transmitting relay TR, via the "tip" connection of the "connecting" plug and jack, through contacts H6, H7, through winding of the supervisory relay I, through contacts O6, O7, of the disconnect relay O, through contacts M2, M3, through exchange teleprinter transmitter XMTR and teleprinter magnet ET, through contacts R3, R4, contacts M8, M7, contacts M4, M5, to earth.

Having received typed indication that the "distant" exchange teleprinter is in circuit the "calling" exchange operator then types the number of the "wanted" subscriber. After which the "answering" key AK can be thrown to the idle position, which will deenergize relay M and release the "home" exchange teleprinter from the called circuit.

(10) *"Distant" exchange establishing connection with the "wanted" subscriber*

The "distant" exchange having observed the number of the subscriber with whom connection is required, inserts a "calling" plug TCP into the "calling" jack MJ (Fig. 3). As previously explained the insertion of this plug starts the "called" subscriber's teleprinter and when current flows relay J is operated. The functions previously outlined cause the transmission of teleprinter impulses that indicate in typed characters on the "calling" subscriber's teleprinter that connection has been completed in the following manner:—

The operation of relay I operates relay J through one winding of relay H, contacts I1, I2, through relay J. The operation of relay J releases the "through" indication by establishing the following circuit:—

From earth, via springs of "answering" key, contacts J1, J2, contacts K1, K2, winding of magnet M3 to battery.

The operation of magnet M3 causes the required teleprinter impulses to be reproduced on contacts L3, L4. The operation of relay J also energizes relay K, through contacts J4, J5, and relay K. The operation of relay K breaks the through release circuit at contacts K1, K2, but not in time to prevent M3 being operated. Relay K locks itself energized, through contacts B3, B4, contacts K3, K4. The operation of relay K also extinguishes the supervisory lamp SL that lights when a "calling" plug is inserted in calling jack MJ, by breaking contacts K5, K6.

The operation of relay K also breaks the operating circuit of relay D by breaking contacts K9, K10. At the termination of the required transmission from contacts L3, L4, contacts L1, L2 are open for a predetermined time. The opening of these contacts interrupts the locking circuit of relay D which becomes de-energized. The de-energizing of relay D causes relay E to become de-energized and so releases the exchange teleprinter from the cord circuit, completing connection.

The cord circuit relay X is designed so that it will not operate when equal value currents flow through the two main windings. When the current in one winding exceeds that of the other, by a predetermined value relay X operates.

It will be understood that means may also be incorporated with the subscriber's apparatus in this arangement also whereby the calling subscriber, on causing the transmission of a particular signal, can obtain an indication individual to the subscriber's apparatus to which he has been connected. This may be printed on the calling subscriber's teleprinter receiver in the same way as the other indications which notify him of the progress of the call. These means have been referred to above in the description with reference to Fig. 4.

(11) *The subscriber calling in the exchange operator*

When the subscriber wishes to call in the exchange operator he depresses his "calling" key CKF (drawing Fig. 4). This causes relay X to operate due to the unbalanced condition produced by different values of current traversing its main windings.

The operation of relay X lights the flashing lamp FL through contacts H4, H5, contacts J6 J7, holding windings of relay X, contacts X2 X1, via contacts of the "answering" key. When this circuit is established the current flowing serves to lock the relay X in the operating condition.

(12) *Engage test at a "trunk" position*

If a "calling" plug is inserted in the "calling" jack of an engaged line teleprinter impulses are transmitted that cause the indication to be typed on the "calling" subscriber's teleprinter that the wanted line is "Busy". This is achieved in the following manner:—

The insertion of the "calling" plug TCP in the "calling" jack of an engaged line causes relay P to become energized. The operation of relay P operated relay Q and magnet M4, in parallel. The operation of magnet M4 causes the required impulses to be produced on contacts R3 R4, that will cause the necessary indication to be typed on the "calling" subscriber's teleprinter.

If connection cannot be made to the "wanted" subscriber, teleprinter impulses can be released that will cause such information to be indicated in typed characters to the "calling" subscriber's teleprinter by inserting the "calling" plug into a particular jack or operating a key.

The following is the method of operation of the circuit arrangements of Figures 9, 10, 11 and 12. These arrangements as previously mentioned, operate on similar general principles to those of Figs. 1, 2, 3 and 4 but a simplification thereoever is shown together with some additional features.

Subscriber calling exchange

To call the exchange the subscriber depresses his "calling" key CFK (Fig. 12) energizing his "calling" relay A at the exchange and causing his "calling" lamp CL to glow through contacts B8, B7, contacts A3, A4. When the "calling" relay operates it locks itself in the operated condition by establishing the following circuit:—

Earth, one winding of relay A, contacts A15, A14, contacts B1, B2, via the line through the subscriber's equipment, back via contacts B5, B4, the second winding of relay A to battery.

Subscriber given indication that he has called the exchange

When current flows in the above circuit the needle of the subscriber's indication meter SIM, will point to "exchange called".

Exchange answering "calling" subscriber

To answer a call the exchange operator inserts an "answering" plug AP of a connecting cord (Fig. 11) into the "answering" jack AJ of the glowing "calling" lamp CL. This operation energizes the "cut-off" relay B and the "display pick-up" relay C in series through the following circuit.

Earth, winding of relay B, "sleeve" connection of "answering" jack and plug AJ, AP., contacts M8, M7, contacts S2, S1, winding of relay C to battery.

Upon the insertion of the "answering" plug AP into the "answering" jack AJ a holding potential is applied to relay A at contacts AJ.1, AJ.2, so that upon the operation of relay B relay A is not de-energized. The operation of relay B, however, extinguishes the "calling" lamp CL by interrupting its circuit at contacts B7, B8.

The operation of relays B and C connects the impulsing relay D of the exchange display equipment to the "calling" subscriber's equipment by establishing the following circuit:

Earth, contacts Z3, Z4, exchange indication meter E.I.M., winding of relay D, contacts C3, C2, contacts M1, M2, tip connection of "answering" plug and jack AP, AJ, contacts A7 A6, contacts B6, B5, via the line through the subscriber's equipment, back via contacts B2, B3, contacts A9, A10, ring connection of "answering" jack and plug AJ, AP, contacts M5, M4, contacts C5, C6 via a resistance to battery.

When current traverses this circuit the "calling" subscriber's motor is started due to the operation of the teleprinter magnet TM., and the needle of his indication meter points to "dial" thus giving him indication that he can dial the "wanted" number.

Also with the operation of relay D, relay E is energized via contacts D2, D3. In operating, relay E removes the resetting potential from the selector "wipers" W1 by opening contacts E2, E1.

The "calling" subscriber giving the number of the "wanted" subscriber

In order to display the "wanted" number at the exchange the subscriber dials two groups of impulses, these groups causing relay D to operate a certain number of times. During the first group of impulses each operation of relay D operates the first number selector magnet (ROT.2) a certain number of times corresponding to the number of impulses recorded on relay D. This is achieved through the following circuit:

Earth, contacts D2, D1, contacts E5, E6, winding of digit selector relay F, first contact position of "wiper" W2 of the digit selector DS, windings of the first number selector magnet (ROT.2) to battery.

The transmission of the first group of impulses through the first number selector magnet (ROT.2) causes the "wipers" of the first number selector NS1 to be set round to a position determined by the number of times ROT.2 is energized.

The transmission of this first group of impulses through the digit selector relay F causes it to operate, and energize through contacts F2, F3, the driving magnet ROT.1 of the digit selector DS.

Consequently, the number of steps made by the first number selector NS1, are the same as the number of impulses signalled in the group. At the end of the transmission of the first group of impulses representing the first digit, the subscriber operates his dial to transmit the second digit. During this time the impulsing relay D and relay E remain energized and relay F is de-energized. When relay F becomes de-energized, the digit selector driving magnet (ROT.1) is also de-energized. This causes the contact arms or so-called "wipers" of the digit selector to be stepped one division, or in other words, on to their next contact.

When the "calling" subscriber releases the dial to transmit the second digit group of impulses, the relay F is again energized in series with the driving magnet of the second number selector (ROT.3) via the second position of the "wiper" W2 of the digit selector DS. The driving magnet of the second number selector (ROT.3) is energized for a number of times equivalent to the number of impulses transmitted in the second group and so steps its "wipers" the same number of divisions.

On the completion of the transmission of the second group of impulses relays D and E remain energized and relay F is again de-energized, causing the "wipers" of the digit selector to be stepped on to the third position. This causes the two selected lamps to light, through the following circuit:

Earth, contacts F2, F1, "wiper" W3 of the digit selector, "wipers" W2 of the two number selectors, via the selected contacts and their respective lamps to battery. Thus the number dialled by the "calling" subscriber is displayed to the exchange operator.

The exchange operator establishing connection with the "wanted" subscriber

Having observed the number displayed by the "calling" subscriber, the exchange operator inserts a "calling" plug CP into the "required" subscriber's "calling" jack CJ. The insertion of the "calling" plug CP into the "calling" jack CJ energizes relays H and B through the following circuit:

From battery, one winding of relay H, ring connection of the "calling" plug and jack CP CJ, winding of relay B, to earth.

With the operation of relay H the supervisory lamp SL lights through contacts H2, H1, contacts L6, L5, contacts O3, O4. The operation of relay B connects the "called" subscriber's equipment to the exchange by closing contacts B5, B6, contacts B2, B3, and establishes the following circuit:

From the positive pole of the signalling battery SB, contacts A5, A6, contacts B6, B5 via the loop through the "called" subscriber's equipment back via contacts B2, B3, contacts A9, A8, via the "tip" connection of the "calling" plug and jack CP, CJ, contacts H5, H6, winding of "supervisory" relay J, contacts N4, N5, via a resistance to the negative pole of the signalling battery.

When current flows through this circuit the "supervisory" relay J is energized and the "called" subscriber's teleprinter relay TM is operated, releasing mechanical functions that cause his teleprinter motor to start.

The energizing of the "supervisory" relay J causes it to operate and to close the energizing circuit of relay K, via contacts J2, J1, contacts H1, H2.

Relay K, in operating, energizes relays L and M through the following circuit:—

Earth, contacts K2, K3, the windings of the respective relays to battery.

It also prepares an energizing circuit for relay N at contacts L3, L4 which is completed after the transmission of the letters "Through" to be explained hereafter. The operation of relay L also extinguishes the "supervisory" lamp SL by opening contacts L6, L5.

The operation of relay M connects the "calling" subscriber's circuit to the "Through" transmitting unit at contacts M2, M3, and retains battery on this circuit via contact M5, M6, contacts H4, H3, "sleeve" connection of the "called" subscriber's calling plug and jack CP, CJ, contacts A11, A12, to battery.

*"Calling" subscriber given indication that connection is completed*

When the connection has been established the letters "Through" are automatically transmitted in the following manner. With the operation of relay L the "release" magnet P of the "Through" automatic signalling unit is energized through the following circuit:

Earth, contacts H2, H1, contacts L6, L7, contacts N10, N9, windings of magnet P to battery.

The operation of this magnet causes the contacts TT1, TT2, to produce teleprinter impulses that will cause the letters "Through" to be typed on the "calling" subscriber's teleprinter through the following circuit:

Earth, contacts TT1, TT2, contacts N1, N2, contacts O1, O2, contacts M3, M2, "tip" connection of "answering" plug and jack AP, AJ, contacts A7, A6, contacts B6, B5, via the loop through the "calling" subscriber's equipment back via contacts B2, B3, contacts A9, A10, ring connection of "answering" jack and plug AJ, AP, contacts M5, M6, contacts H4, H3, "sleeve" connection of "calling" jack and plug CP, CJ, contacts A11, A12, to the negative pole of the signalling battery.

*Exchange operator given indication that connection has been established*

During the transmission of the letters "Through", contacts TT3, TT4, are closed causing the "through connection" lamp TL to glow.

*Extending the call to the "wanted" subscriber*

On the completion of the transmission of the letters "Through", contacts TC1, TC2 are closed for a pre-determined period. This energizes relay N through the following circuit:

Earth, contacts TC1, TC2, contacts N6, N7, through winding of relay N, contacts L4, L3, to battery. Relay N in operating, locks itself through contacts N8, N7. With the operation of relay N the "calling" and "called" subscribers are connected together by the closing of contacts N2, N3, earth being removed from the "calling" subscriber's circuit at N1 and battery from the "called" subscriber's circuit at N4.

*The "calling" subscriber verifying exchange connection*

After the reception of the indication that he is "through" and wishing to verify that the exchange has connected him to the required number, the "calling" subscriber can, by depressing his "Who are you" key, cause the "called" subscriber's teleprinter to transmit teleprinter impulses that will cause its exchange number to be printed on the "calling" subscriber's teleprinter.

*Automatic release of the exchange display equipment from the cord circuit*

(a) Upon the energization and operation of "supervisory" relay J following the insertion of the "calling" plug CP into the "calling" jack CJ, relay K is energized via contacts J1, J2. This completes a circuit through relay M via contacts K2, K3. The operation of relay M causes the "display pick-up" relay C and therefore "impulsing" relay D to become de-energized and releases them from the cord circuit by opening contacts M2, M1, M8, M7. The operation of relay M also causes relay B to be connected in series with the locking winding of relay H so that upon the clearing of the call the "supervisory" lamp is not extinguished until both plugs have been removed.

(b) After "impulsing" relay D has remained de-energized for a certain period, the "resetting" relay E also becomes de-energized. The opening of contacts E2, E3 de-energizes the "off-normal" relay G. Relay E being de-energized, causes a "resetting" potential to be applied to the "resetting wiper" W1 of the digit selector through contacts E2, E1, and windings of relay W. This causes the "wipers" of the digit selector to be rotated to their normal position. When the "wipers" of the digit selector reach the normal position a potential is applied to the "resetting wiper" W1 of the first number selector via contacts G2, G1. This causes magnet ROT2 to rotate the "wipers" of the first number selector NS1 to their normal position. When the "wipers" of the first number selector reach the normal position a potential is applied to the "resetting wiper" W1 of the second number selector NS2, causing magnet ROT3 to rotate the "wipers" of the second number selector NS2 to their normal position.

(c) While the above operations are taking place relay W is energized and in operating energizes relay Z via contacts W2, W1. Upon operating, relay Z causes the "display clearing" lamp DCL to be lighted via contacts Z6, Z7. Upon the completion of the resetting of the selectors relay W is de-energized, de-energizing relay Z and extinguishing the "display clearing" lamp DCL, giving the operator indication that resetting has taken place.

*Exchange receiving indication when connection is disengaged*

Having completed transmission, either subscriber depresses his "clearing" key CK which immediately clears the connection at the exchange and lights the "supervisory" lamp in the following manner:

After the "calling" or "called" subscriber has depressed his "clearing" key CK for a predetermined period, the "supervisory" relay J becomes de-energized, de-energizing relay K. Relay O is then energized via contacts K2, K1, contacts L1, L2, relay L still being energized. The operation of relay O causes the "supervisory" lamp SL to glow via contacts O5, O4. The line circuit is also interrupted at contacts O2, O1, so that upon the release of the "clearing" key relay J is not again energized.

*Automatic clearing of exchange connection*

To prevent the subscriber holding the line indefinitely after he has concluded his transmission, a device is incorporated in the teleprinter by which a call will be automatically cleared after an idle line period of approximately two minutes. The opening of a pair of contacts by this device causes the same functions at the exchange as the operation of the subscriber's "clearing" key CK and in addition the motor circuit of the subscriber's teleprinter is opened stopping the motor.

The sequence of operation of the contacts by this device is as follows:—Upon the automatic operation due to the action of the call clearing device a predetermined interval after cessation of signalling, contacts AS1, AS2 are opened clearing the line, just prior to the opening of contacts AS5, AS6, causing the stopping of the motor. Upon the opening of contacts AS5, AS6, contacts AS3, AS4, are closed preparing the subscriber's circuit for the next call. Upon receipt of the first impulse of the next call, contacts AS1, AS2 are closed immediately followed by the opening of contacts AS3, AS4, and the closing of contacts AS5, AS6, the latter effecting the starting of the teleprinter motor.

*Exchange operator breaking down connection at the exchange*

Having observed the glowing "supervisory" lamp SL the exchange operator breaks down the connection by removing both the "answering" and "calling" plugs. This action de-energizes relay B and relay H. With the de-energizing of relay H, relays L, M, N and O also become de-energized and thus the cord circuit is again in the idle condition. The de-energizing of relay O extinguishes the "supervisory" lamp SL by opening contacts O4, O5. It should be noted that relay H cannot be de-energized and therefore the "supervisory" lamp SL extinguished until both plugs are removed, as its locking winding is energized from earth via relay B and the "sleeve" connection of the "answering" plug AP. The motors of the two teleprinters automatically stop after a short period.

*"Calling" subscriber given indication that the "wanted" subscriber is engaged*

When the exchange operator is asked for a subscriber whose line is engaged, she depresses her "engaged" key EK and teleprinter impulses are automatically transmitted, causing the letters "Busy" to be printed on the "calling" subscriber's teleprinter. This transmission is indicated to the exchange operator by the glowing of the "busy" transmission lamp ETL. The automatic transmission of the letters "Busy" is achieved in the following manner:

Upon the depression of the "engaged" key EK relay S and magnet T are energized in series. Relay S operates and breaks the operating circuit of relay C at contacts S1, S2. Relay C becomes de-energized connecting the "calling" subscriber to the "busy" transmitting contacts BT1, BT2 via contacts S5, S4, contacts C1, C2. Battery is removed from contact C6 and applied to contact C4 via contacts S10, S11. With the operation of relay S the energizing circuit of relay B is retained through the locking winding of relay S via contacts S2, S3.

The operation of relay S also causes the "engaged" transmitting lamp ETL to glow via contacts S6, S7. At the completion of the transmission of the letters "Busy" contacts BI 1, BI 2, are closed energizing relay U via contacts S9, S8. In operating, the relay locks itself via contacts U1, U2 and remains energized until relay S is de-energized.

Upon operating, relay U lights the "positive engaged" lamp PEL via contacts U3, U4 giving the operator positive indication that the letters "Busy" have been transmitted. After the lighting of the "positive engaged" lamp PEL, the operator removes the "answering" plug AP from the "answering" jack AJ thus de-energizing "cut-off" relay B and relay S, and thereby de-energizing relay U and extinguishing the "positive engaged" lamp PEL.

*Subscriber obtaining teleprinter connection with the exchange*

Should the subscriber require teleprinter conversation with the exchange, he will dial a predetermined number, upon the reception of which the operator will connect him through to the operator's position in an identical manner with that when connecting through to another subscriber.

*Subscriber clearing a call before the exchange operator has answered*

If, after calling the exchange and before being answered, the subscriber decides that he does not want to make the call, he will depress his "clearing" key CK and thus interrupt the energizing circuit of his "calling" relay A. This relay is de-energized and his "calling" lamp CL is extinguished thereupon.

*Subscriber clearing due to mis-dialling*

Should the subscriber make a mistake whilst dialling the number he requires, he will depress his "clearing" key CK and thus interrupt the energizing circuit of "impulsing" relay D causing it to become de-energized. This, in turn, will de-energize relay E which will apply a "resetting" potential to the "resetting wipers" of the selectors via the winding of relay W as explained above (para. 10) and the selectors will be returned to normal.

Relay W being energized operates and energizes relay Z which locks itself through the following circuit:

Earth, contacts D2, D1, contacts E5, E4, contacts C8, C7, contacts Z2, Z1, winding of relay Z to battery.

In operating, relay Z removes earth from the "impulsing" relay D by opening contacts Z3, Z4 and therefore the "calling" subscriber cannot effect its operation by further dialling.

With the operation of relay Z the "dial clearing" lamp DCL is also lighted via contacts Z6, Z7.

Seeing the glowing "dial clearing" lamp DCL the operator removes the "answering" plug AP from the "answering" jack AJ which de-energizes relay C. In becoming de-energized relay C interrupts the energizing circuit of relay Z at contacts C7, C8, which upon becoming de-energized connects earth again to the "impulsing" relay D at contacts Z3, Z4. At the same time the "dial clearing" lamp DCL is extinguished due to the opening of contacts Z6, Z7.

What is claimed is:

1. In a telegraph system, a central interconnecting station, a source of signalling current thereat, a plurality of subscribers' stations, a line circuit between said central and each of said subscribers' stations, a relay at the central station operable in response to an earth condition on the line circuit for indicating a calling signal, a cord circuit at the central station connectable between any two of said subscribers' stations, and a second relay in said cord circuit normally energized during telegraphic communication therethrough but responsive to a break signal of predetermined minimum length of time for indicating a clearing signal.

2. In a telegraph system, a subscriber's station, a line circuit signal transmitting and receiving apparatus, a source of mechanical power for driving said apparatus, electro mechanical means responsive to the first current impulse in said line circuit for starting said mechanical power and to stop said power a predetermined interval of time after the cessation of signalling impulses, a key for earthing the line circuit for sending a calling signal, and other key means also operated by said electro-mechanical means to open said line circuit for sending a clearing signal.

3. In a telegraph system, a plurality of subscribers' stations, a central interconnecting station, a line circuit connecting each of said subscribers' stations to said central station, a cord circuit through which any two subscribers' stations can be connected to the central station, a relay individual to each line circuit at the central station and operable in response to an earth condition on the corresponding line to indicate a calling signal, a second relay in said cord circuit operable on connection of any two subscribers' stations therethrough and responsive to a break signal exceeding a predetermined length for indicating a clearing signal, the first said relay also being responsive to said break signal before the connection of the cord circuit to the subscriber's line, for discontinuing the calling signal.

4. In a telegraph system, a central interconnecting station, a source of signalling current thereat, a plurality of subscribers' stations each comprising a telegraph signal receiving relay, telegraph signal transmitting contacts and dialling impulse transmitting contacts connected together in series in a normally closed circuit at the subscriber's station, a resistance connected across said dialling impulse contacts for maintaining operated said telegraph signal receiving relay during transmission of dialling impulses, a key connected between the mid-point of said receiving relay and earth for sending a calling signal, and other key means connected in series in said line circuit at the subscriber's station for sending a clearing signal.

5. In a telegraph system, a plurality of subscribers' stations, each provided with printing telegraph apparatus, driving means therefor and an impulsing dial, a central station to which each of said subscribers' stations is connected by a line circuit, said central station having an answering and a calling jack associated with each subscriber's line circuit and a cord circuit co-operating with said jacks, a display equipment associated with said cord circuit, and means responsive to the connection of said cord circuit with the answering jack of a calling subscriber for placing said display equipment under control of the impulsing dial and for starting the driving means at said subscriber's station.

6. In a telegraph system, a plurality of subscribers' stations, each provided with an impulsing dial, a central station to which each of said subscribers' stations is connected by a line circuit, said central station having an answering and a calling jack associated with each line circuit, and a cord circuit provided with a pulsing circuit, a display device associated with said cord circuit, said device comprising a series of number indicators, a corresponding series of number switches each having a motor magnet and adapted to complete an operating circuit for any one of the corresponding number indicators, a digit selector switch having a motor magnet and adapted to successively associate the motor magnets of consecutive number switches with said pulsing circuit, a slow-release relay in said pulsing circuit adapted to complete an operating circuit for the motor magnet of the digit selector switch at the end of each series of impulses transmitted through said pulsing circuit, and means responsive to the connection of said cord circuit with the answering jack of a calling subscriber's line circuit for placing said cord pulsing circuit under control of the calling subscriber's impulsing dial.

7. In a telegraph system, a calling and a called subscriber's station, a printer at each of said stations, a central station through which said subscribers' stations can be interconnected, means for establishing a connection from a calling to a called subscriber's station in a plurality of stages, and means at the central station responsive to the progress of operations in extending a call from the calling to the called subscriber's station for transmitting progress signals to the printer at said calling subscriber's station at more than one stage in said progress of operation.

8. In a telegraph system, a plurality of subscribers' stations having transmitting and receiving apparatus, a central interconnecting station, a link circuit thereat through which any two of said subscribers' station can be connected, the connection between two stations being established in a plurality of stages, and means associated with said link circuit to transmit progress signals composed of groups of impulse combinations to a calling subscriber for indicating the progress of a call which signals are transmitted at more than one stage of the call progression and are translated and printed on the receiving apparatus normally provided for telegraph communication.

9. In a telegraph system, a plurality of subscribers' stations having transmitting and receiving apparatus in series in a line circuit, a central station, a cord circuit thereat having a calling and an answering plug for connecting any two of said subscribers' stations therethrough, relay means associated with said cord circuit responsive to the completion of a circuit to a called subscriber through said calling plug, signalling means controlled thereby to send a "through" indication to a calling subscriber through said answering plug, and other relay means operated on completion thereof to disconnect said signalling means and to complete the circuit between said two subscribers' stations.

10. In a telegraph system, a subscriber's station, a central station to which said subscriber's station is connected by a line circuit, a first cord circuit at the central station to which said subscriber's station can be connected, a second cord circuit, a tie line for connecting said first and second cord circuits, transmitting and receiving apparatus at said subscriber's station, motor means associated with said receiving apparatus and operable in response to the connection of said subscriber's station to said first cord circuit, transmitting and receiving apparatus associated with said second cord circuit, motor means associated with said cord circuit receiving apparatus and operable in response to the connection of said first cord circuit to said tie line, said cord circuit receiving apparatus being effective to receive an indication of a required subscriber's number from said subscriber's station when the second cord circuit is connected to said tie line.

11. In a telegraph system, a subscriber's station provided with a printer and driving means therefor, a central station to which said subscriber's station is connected by a line circuit, a first and a second cord circuit and a tie line at the central station, a printer and driving means therefor associated with the second cord circuit, a normally closed locking circuit for holding said last mentioned driving means inoperative, a start relay for controlling said locking circuit, means responsive to the connection of the first cord circuit to said subscriber's line circuit for starting the driving means at the subscriber's station and for extending the subscriber's line circuit to the first cord circuit, means responsive to the connection of the first cord circuit to the tie line for energizing a pilot circuit and extending said subscriber's line circuit to the tie line, said start relay being operated in response to the energization of said pilot circuit to render said driving means operative, and means responsive to the connection of the second cord circuit to the tie line for interconnecting the printer at the subscriber's station and the printer at the second cord circuit.

12. In a telegraph system, a central station having a plurality of cord circuits, a corresponding plurality of keys, transmitting and receiving apparatus for telegraphic communication and connectable to any of said cord circuits through the corresponding one of said keys, a source of mechanical power for driving said apparatus, means for controlling said source of mechanical power and operated by a signal receiving magnet in said receiving apparatus, an auxiliary winding in said magnet and energizable through all of said keys in series to hold said means in a stop position for said power, and a pilot circuit energized on receipt of a calling signal to send an impulse through said keys and auxiliary winding to start said source of power.

13. In a telegraph system, a plurality of subscribers' stations having signal transmitting and receiving apparatus, a line connecting said central to each subscriber's station, a source of mechanical power for each of said subscriber's apparatus, control means for said power and operable on response of the subscribers receiving apparatus, to the first impulse received over the line circuit, a key for earthing said line for a predetermined minimum interval of time, relay means at the central station operable in response thereto and thereafter maintained operated under local control, other key means for breaking said line circuit for a predetermined minimum interval, and a supervisory relay in each cord circuit operable on connection of any two subscribers' stations therethrough and responsive to said break in the line circuit for indicating a clearing signal.

14. In a telegraph system the combination as set forth in claim 13 together with other relay means operated by said supervisory relay for independently breaking the line current through the cord circuit and for lighting a signal lamp.

15. A telegraph system comprising a plurality of subscribers' stations each having telegraph signal transmitters and receiving apparatus, dialling impulse transmitting means and break signal key means all in series in a line circuit, a key for earthing the line circuit for sending a calling signal and power driven means for said telegraph apparatus under the control of signal currents received over the line circuit, a central interconnecting station having a plurality of cord circuits, a source of signal current, relay means responsive to an earthing signal in each subscriber's line circuit, means to connect one side of a cord circuit to a calling subscriber's line, a display equipment, relay means to connect said equipment to said cord circuit on connection to a calling subscriber's line, means to connect the other side of said cord circuit to a required subscriber's line, and relay means in said cord circuit operated on completion of a circuit to a required subscriber to release said display equipment and to complete a telegraph circuit through both sides of said cord circuit.

16. In a telegraph system, a calling subscriber's station associated with a first central station, a called subscriber's station associated with a second central station, each of said stations being provided with a printer and driving means therefor, means for interconnecting the printer at the calling subscriber's station with the printer at the first central station and for starting the driving means therefor, means for subsequently disconnecting said connected printers, means for then connecting the printer at the first central station with the printer at the second central station and for starting the driving means for the latter of these printers, means thereafter effective for disconnecting the printer at the first central station from the printer at the second central station, for stopping the driving means for the former of these printers, and for connecting the printer at the calling subscriber's station with the printer at the second central station, and means finally effective for disconnecting the printer at the second central station from the printer at the calling subscriber's station, for stopping the driving means for the former of these printers, for interconnecting the printer at the calling subscriber's station with the printer at the called subscriber's station and for starting the driving means for the last mentioned printer.

17. In a telegraph system, a subscriber's station associated with a central station, a first and a second cord circuit and a tie line at the central station, a printer and driving means therefor associated with the second cord circuit and another printer and driving means therefor at the subscriber's station, a code transmitting device likewise associated with the second cord circuit, means for starting the driving means at the subscriber's station when the first cord circuit is connected to the subscriber's station to indicate that connection has been established, means for starting the driving means for the cord circuit printer when the first cord circuit is connected to the tie line, and means effective when the second cord circuit is connected to the line for causing the code device to operate the calling subscriber's printer to indicate that connection has been established to the second cord circuit.

18. In a telegraph system, a subscriber's station associated with a first central station, a trunk cord circuit at said central station, a printer with driving means therefor at said subscriber's station and another printer with driving means therefor associated with said trunk circuit, a second central station associated with the first central station, a trunk cord circuit thereat provided with an associated printer with driving means therefor and an associated code sending device, means effective when the calling subscriber's station is connected to the trunk cord circuit at the first central station for connecting the printer at the calling subscriber's station to the printer associated with the trunk cord circuit and for starting the driving means for this latter printer, means at the first central station for connecting the cord circuit printer in the trunk cord circuit and disconnecting the printer from the subscriber's printer, and means effective when the first central station trunk circuit is connected to the second central station cord circuit for interconnecting the first and second central station printers, for starting the driving means for the printer at the second central station and for actuating the code sending device to operate the printer at the first central station to indicate that connection with the second central station has been established.

19. In a telegraph system, a plurality of subscribers' stations, each provided with a printer and driving means therefor, a central station associated with said subscribers' stations, a cord circuit through which any two subscribers' stations can be interconnected, a code sending device associated with said cord circuit, means effective when said cord circuit is connected to a calling subscriber's station for starting the driving means thereat and for connecting the subscriber's printer to said cord circuit, means responsive to the connection of the cord circuit to a busy subscriber's station for placing the calling subscriber's printer under control of the code sending device and for actuating said devices to send "busy" signals to the subscriber's printer, supervisory means at the central station responsive to the connection of the cord circuit to the busy subscriber's station and other supervisory means operable during the actuation of said code sending device.

20. In a telegraph system, a calling and a called subscriber's station, a printer at each of said stations, a central station through which said subscribers' stations can be interconnected, means for establishing a connection between calling and called stations in a plurality of stages, means responsive to the progress of operations in extending a call from the calling to the called subscriber's station for transmitting signals indicative of the progress at more than one stage of the call progression, and means for causing said transmitted signals to operate the printer at the calling subscriber's station to record such stages of progress.

RONALD GEORGE GRIFFITH.